United States Patent [19]

Aigner

[11] 4,172,381

[45] Oct. 30, 1979

[54] FLOWMETER FOR LIQUIDS

[76] Inventor: Georg Aigner, Nuremberg, Fed. Rep. of Germany

[21] Appl. No.: 893,560

[22] Filed: Apr. 5, 1978

[30] Foreign Application Priority Data

Apr. 5, 1977 [DE] Fed. Rep. of Germany ....... 2715239
Apr. 5, 1977 [DE] Fed. Rep. of Germany ....... 2715240

[51] Int. Cl.² ............................................. G01F 1/06
[52] U.S. Cl. ..................................................... 73/229
[58] Field of Search ...................... 73/229, 231 R, 189

[56] References Cited

U.S. PATENT DOCUMENTS

| 3,360,989 | 1/1968 | Herrington | 73/189 |
| 3,751,642 | 8/1973 | Todd et al. | 73/229 |
| 3,866,469 | 2/1975 | Wemyss | 73/229 |
| 3,867,840 | 2/1975 | Baatz | 73/229 |
| 3,922,525 | 11/1975 | Kozak et al. | 73/231 R |

FOREIGN PATENT DOCUMENTS 2502599 7/1976 Fed. Rep. of Germany ............. 73/229

Primary Examiner—Stephen A. Kreitman
Attorney, Agent, or Firm—Allison C. Collard; Thomas M. Galgano

[57] ABSTRACT

An improved flowmeter for liquids is provided of the type which includes a housing, a cylindrical chamber formed in the housing, a shaft rotatably mounted in the housing and extending coaxially through the chamber, an impeller mounted on the shaft and an inlet and outlet channel provided in the housing and communicating with the chamber. The impeller is provided with a coaxially disposed circular disc having a plurality of radiation-permeable passageways formed therethrough spaced about the periphery thereof. A radiation source is disposed on the side of the disc and a radiation sensor on the other side of the disc in axial alignment with the passageways thereof. The flowmeter is especially useful for accurately determining relatively low flow rates.

10 Claims, 13 Drawing Figures

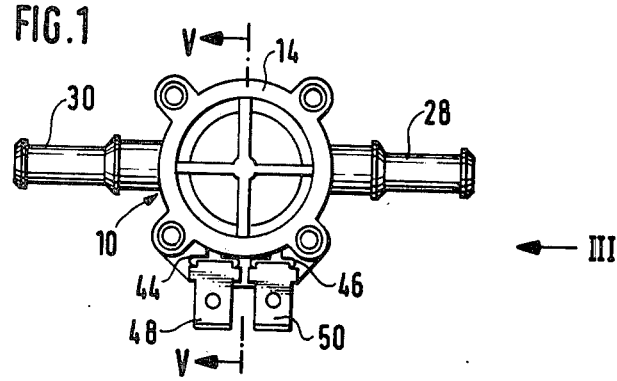
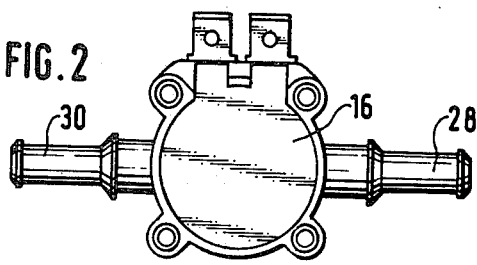
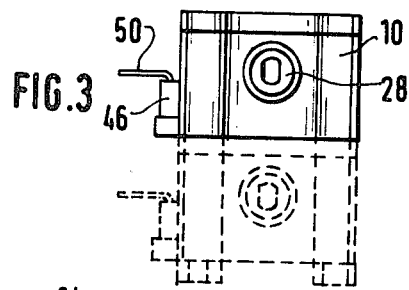
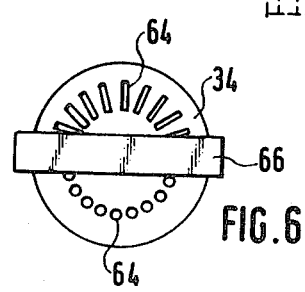
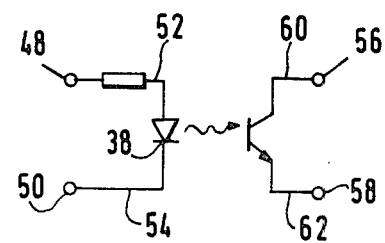

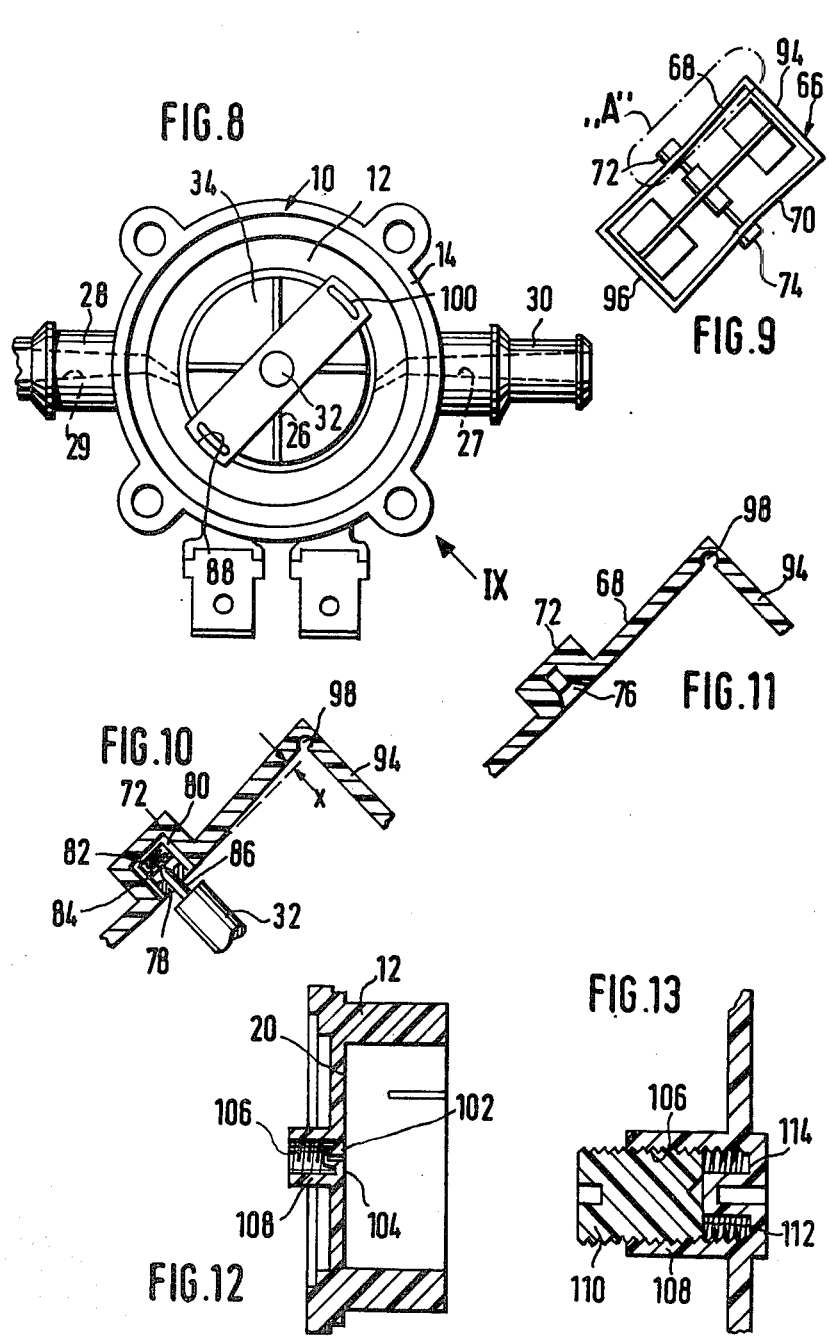

FLOWMETER FOR LIQUIDS

The present invention relates to a flowmeter for liquids. More particularly, it relates to a flowmeter of the type which has a substantially cylindrical chamber positioned within a housing which receives a cylindrical axis or shaft on which an impeller is rotatably mounted and which has an inlet and outlet channel communicating therewith provided in the housing wall encompassing the chamber.

Flowmeter for liquids are known wherein the impeller is actuated by a single liquid jet stream. Meters of this type normally require relatively high stationary pressures and are therefore only useable for measuring relatively high liquid quantities. However, very often a problem exists in that relatively low pressure and almost pressureless liquid quantities often have to be measured or controlled, for example, in the medical and pharmaceutical fields, or for determining the fuel consumption in vehicle combustion engines.

In order to precisely indicate the flow of a liquid at a given moment without complicated and expensive devices to balance an error, the flowmeter should have a linear error curve, i.e., the possible deviations from the actual value should be evenly dimensioned over the total measuring range. This is of particular importance when the number of rotations of the impeller is used in an electrical manner for indicating the given flow.

Devices are known for obtaining a linear curve in flowmeter. For this purpose, stagnation ribs are provided in the housing which have to have a certain axial expansion in order to be effective. This type of construction is detrimental to the structural dimension of the device which is only effective when a sufficient static pressure is present. When measuring low or almost pressureless flowing liquid quantities, such a structure would not be sufficient.

It is therefore an object of the present invention to provide a flowmeter for liquids which is suitable for relatively low liquid quantities and which may be operated with liquids which almost do not exert any pressure at all, as a result of which the flowmeter should have a high degree of sensitivity. At the same time, the device should have a linear error curve across the total measuring range and should also be fool-proof, simple and relatively inexpensive. In particular, the device should be such that it may be used in two flow directions, so that it independently operates in either flow direction.

Certain of the foregoing and related objects are readily attained in accordance with the present invention by the provision of a flowmeter for liquids which includes a substantially cylindrical chamber positioned within a housing which receives a freely rotatable cylindrical axis or shaft on which an impeller is mounted and an inlet and outlet channel which are provided in the housing wall and which communicate with the cylindrical chamber. The impeller is symmetrically shaped relative to a vertical center plane lying normally and passing through the center of the cylinder axis and includes a circular disc, lying in this vertical center plane, disposed normally to, and coaxially mounted on the shaft, at the center point thereof. The circular disc is provided at its upper and lower side with impeller plates or vanes disposed radially thereabout in equal angular distances with respect to each other and which lie in radial planes which cut into the axis of the disc. Furthermore, the inlet and outlet channels are symmetrically arranged with respect to this center plane and a diametrical plane of the chamber. The channels each have an inner end segment having a rectangular cross section which tapers inwardly in such a way that the opening thereof facing the chamber forms a small slot parallel to the axis of the shaft. The segment of each channel opening into the chamber provides a direction for the liquid flow which is fully admitted onto the impellers. The disc is provided with radially-disposed passageways or apertures formed therethrough spaced apart in equal angular distances from each other. In alignment with the portion of the circular travel path of these apertures (due to rotation of the disc), a radiation source is provided which is mounted in the housing at one side of the disc. On the other side of the disc, a sensor is provided which is excited into pulses by the rays of radiation emitted by the radiation source; the apertures of the disc for the rays of radiation emitted by the radiation source being radiation permeable but the disc outside of the passageways being impermeable to radiation.

Due to the axial and radial symmetrical arrangement of the elements which are essential for the flow procedures, this does not only provide the advantage of a very simple structure, but also permits the employment of the device in a liquid flow in any given direction without any special consideration with respect to the direction of flow. Furthermore, practical tests have shown that such a constructed flowmeter provides a linear error curve and also has an extremely high degree of sensitivity, so that the device may be used as a laboratory device and also may be applied in all occasions where low pressure liquid flows have to be measured. Since a great number of apertures may be provided on the disc, there exists the possibility of yielding a very high number of pulses during a single rotation of the measuring disc, so that the dissociation capability is increased to a degree which heretofore was not known. Thus, measurements may be made and perceived even with an extremely slow rotating measuring disc.

In a preferred embodiment of the invention, the impeller plates or vanes are spaced from the shaft, to prevent a heavy breaking of the impeller which would slow the speed of the impeller and would result in poor or no reaction to further increases of the flow quantity. Therefore, the vane spacing serves to increase the measuring range upwardly.

In a further advantageous embodiment, the radiation source is a photo diode and the sensor is a photo-transistor. Since the photo-transistor emits an electrical pulse when exposed to radiation from the photo diode, the voltage of which is substantially constant, the flow quantity is solely indicated by the pulse density, while the emitted voltage remains substantially unchanged, independent of the number of rotation of the measuring disc.

In a further preferred embodiment, the radiation source is an infrared diode and the passageways of the discs are in the shape of apertures.

In a further advantageous embodiment, the disc is made of material permeable to the radiation from the radiation source and is covered by a radiation impermeable layer except for the apertures. Preferably, the disc and measuring wheel are made as a unitary piece.

In a particularly advantageous embodiment, on opposite sides of the disc, two radiation sources and two sensors are provided and the sensor discharges are coupled with inputs of a discriminating circuit.

In order to use these advantages in an optimum manner, a substantially play-free and resistance-free bearing of the impeller is required so as to prevent the influence of bearing friction and, so that the rotation of the impeller is only dependent on the liquid quantity flowing through the meter. In order to mount the impeller substantially free of play and simultaneously free of outside force influences, in a further preferable embodiment of the invention, an annular shaped closed bearing bracket is provided which includes two oppositely disposed and spaced-apart segments, pretensioned with respect to each other, which lie in a plane normal to the impeller axis, and each of which provides a bearing for the ends of the impeller axis or shaft. The axial length of the impeller axis is slightly longer than the distance between the pretensioned bearing segments. This ensures a play-free mounting of the impeller axis in an axial direction in the bearing bracket, and that the assembly unit consisting of the bearing bracket and the impeller is free of any stress and is positively positioned in the housing.

In this embodiment of the flowmeter, the play-free and substantially stress-free mounting of the impeller in the bearing bracket is carried out before mounting in the housing; when inserting the assembly unit into the housing, the bearing characteristics are not altered.

In a preferred embodiment of the invention, the inner wall of the housing is provided with recesses for receiving the bearing bracket in such a way that the inner faces of the bearing bracket, facing the impeller, are coupled positively to the adjacent inner face of the housing and lie flush therewith.

In a further embodiment of the invention, the pretensioned segments of the bearing brackets are provided with outwardly protruding reinforcements in which the bearing supports for mounting the impeller shaft are provided. These reinforcements are maintained at a small distance away from the adjacent housing surface so as to prevent outside influence on the impeller bearing after inserting the assembly unit (i.e., bearing bracket and impeller) into the housing. In accordance with a particularly preferred dimension, the distance between the reinforcements and the housing surfaces is about 0.1 mm.

In a further advantageous embodiment, the space between the outer face of the reinforcement and the adjacent housing surface is coupled to the inner housing space by means of a slot which is admitted by the flow of the liquid flowing through the meter. The liquid in this space acts as a shock absorber during vibration of the flowmeter, so that a play-free and tension-free mounting of the bracket and impeller unit is ensured even during a non-gentle operation of the flowmeter. As a result of this liquid attenuation cushion, the spring path of the bearing bracket is limited by elastic attenuation. In a further embodiment of the invention, the bearing bracket together with the bearing bracket pretensioned segments are extruded in one-piece.

In a further advantageous embodiment of the invention, hinges are provided at least where the pretensioned bearing segments merge with the bearing segments which normally run parallel to the impeller axis by tapering the cross-sectional width of the bearing bracket at these merger points. The hinges may desirably be in the form of apertures or channels which are provided in the corners where these bearing bracket segments merge. Due to this hinge-like, cross-sectional tapering, the spring path is evenly determined since the impeller mounting is practically pivotable around these hinge joints. The apertures provided in the bearing bracket contribute to the soft linear spring action of the bearing supports and prevent a tilting of the bearing.

In another embodiment of the invention, bearing elements for supporting the impeller axis are extruded onto the bearing bracket for receiving the impeller axis.

In accordance with a further embodiment of the invention, the bearings are inserted into the bearing brackets and are provided with abutments which have a spring action in radial direction for fixing the axial mounting of the impeller.

In yet a further embodiment of the invention, the play-free and tension-free mounting of the impeller is provided by a bearing element for the impeller axis which is extruded to the wall section of the housing which is approximately coaxial with respect to the impeller axis. This mounting element is suitably coupled by means of a membrane-like connection to this wall section. A finely-adjustable adjustment screw is associated with an internally threaded cylindrical shoulder provided on the outside of this wall section in axial alignment with the bearing element and which adjusts the bearing element relative to the wall section for a play-free mounting of the impeller axis. Thereby, it is particularly advantageous that the front face of the adjustment screw facing the bearing element be provided with a conical central indentation into which the bearing element engages with a corresponding cone-shaped shoulder.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention.

In the drawings, wherein similar reference characters denote similar elements throughout the several views:

FIG. 1 is a plan view of a flowmeter embodying the present invention;

FIG. 2 is a bottom view of the flowmeter shown in FIG. 1;

FIG. 3 is a side elevational view of the flowmeter shown in FIG. 1, taken in the direction of arrow III and rotated by about 90°;

FIG. 6 is a plan view of the impeller held in a bearing bracket, and showing at both sides of the bearing, the impeller provided with alternate embodiments of the measuring wheel;

FIG. 7 is a schematic showing the electrical arrangement within the flowmeter;

FIG. 8 is a top view of the flowmeter as shown in FIG. 5, with the upper part of the housing removed;

FIG. 9 is a side view taken in the direction of arrow IX in FIG. 8, with the housing removed;

FIG. 10 is fragmentally-illustrated, cross-sectional view, in part elevation, of the portion of the meter enclosed in phantom line and referred to by reference numeral A in FIG. 9, enlarged to approximately twice the size and showing a first embodiment of the mounting means for the impeller axis;

FIG. 11 is a view similar to that of FIG. 10, but showing an alternate embodiment for mounting the impeller axis;

FIG. 12 is a sectional view of the upper housing portion shown in FIG. 5 with an extruded fine adjustment bearing unit for mounting the impeller axis; and FIG. 13 is a fragmentally-illustrated, enlarged view of the fine adjustment bearing unit shown in FIG. 12 and further showing the employment of a fine adjustment screw.

Figure 4:
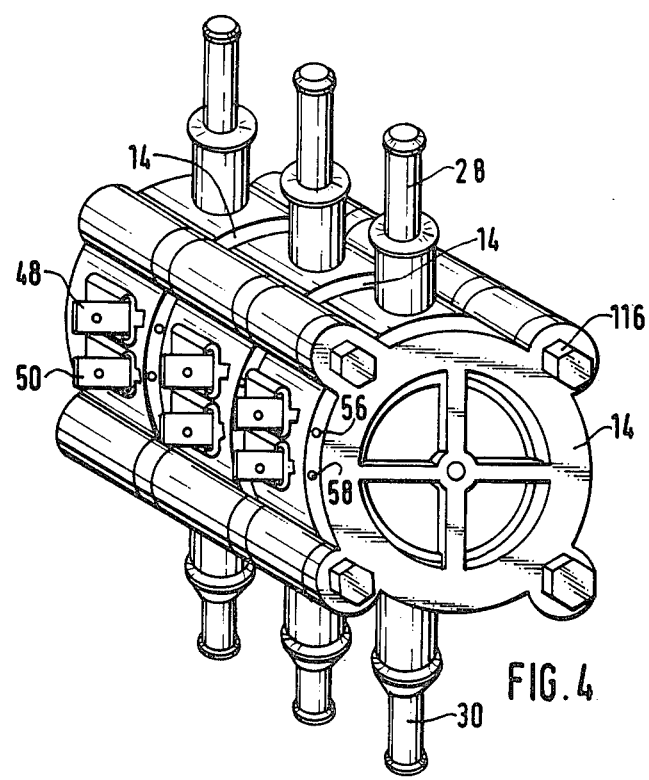
FIG. 4 is a perspective view of a measuring battery including a plurality of flowmeter embodying the present invention.

Referring now in detail to the drawings, a flowmeter embodying the present invention consists of a housing 10 which essentially consists of a lower housing part 12 and an upper housing part 14 (FIG. 8) on which cover plates 16 (FIG. 5) may be provided for covering the electrical elements (to be discussed in greater detail hereinbelow). The various parts of the meter as well as the impeller 26 which is encompassed by housing 10, are fabricated from a plastic which is resistant with respect to the liquids to be measured.

Housing part 14 has a lateral well section 18 and a wall segment 20 normally disposed thereto which, together with a wall section 22 of part 12, encompass a cylindrical chamber 24, wherein an impeller 26 is mounted coaxially disposed and free-running. Impeller 26 is rotated by a flow of liquid which flows through chamber 24; rotation of impeller 26 being dependent on the flow quantity per time unit. As seen in FIG. 8, inlet and outlet connections 28 and 30 are provided on the housing for feeding and discharging the liquid. The inlet and outlet channels 27, 29 which discharge into chamber 24 by the inlet or outlet connections 28 and 30 are provided with tapered end portions having a rectangular cross section which form a small axial slot, parallel to the impeller axis, so as to admit onto impeller 26 a guided liquid jet stream.

Normally, impeller 26 is provided with an annular disc 34 disposed in the center of cylindrical chamber 24 on the upper and lower surfaces of which vanes 36 are provided at corresponding locations in equal angular distances and cutting into the radial plane crossing the impeller axis 32. On the wall portion of lower part 12, an infrared photo diode 38 is provided, and a phototransistor 42 is oppositely arranged in parallel position at the corresponding wall portion 40 of upper part 14.

As seen in FIG. 1, at the outside of the lower part 12, recesses 44 and 46 or soldering lugs 48, 50 are provided for the electrical coupling of the infrared diode 38; the soldering lugs 46, 48 being coupled with connecting lines 52, 54 (FIG. 7) with infrared diode 38. Photo-transistor 42 is coupled by means of plug connectors 56 and 58 (FIG. 4) in upper part 14 and with corresponding line connections 60, 62 (FIG. 7).

Disc 34 is provided with apertures 64 and is positioned between the connecting lines of infrared diode 38 and photo-transistor 42 in a radial distance from the impeller axis 32, whereby the apertures are distributed in equal angular distance over the total circumference of the disc.

When impeller 26 is actuated by the flowing liquid through the flow meter, infrared diode 38 is excited to emit infrared rays by means of the voltage applied through the soldering lugs 48 and 50, and the rays to photo-transistor 42 are released at the time one of the apertures 64 passes by infrared diode 38.

The infrared rays which are emitted to the phototransistor 42 generate an electrical pulse with a given (specific) voltage. When the speed of the liquid flow increases, the angular speed of impeller 26 also increases, This, in turn, increases the pulse density of the pulses which discharge from the photo-transistor 42 through plug connections 56, 58. It is quite obvious that the dense arrangement of the apertures results in a comparable high pulse sequence per impeller rotation, so that a very high measuring exactness is obtained even in very low flow rates. If a second light barrier is provided in an angular distance from the first light barrier (i.e., infrared diode 38 and photo-transistor 42), the outlets of the photo-transistor may be coupled to a discriminator circuit which permits, for example, to exactly measure the forward or return flows and to carry out adjustment, control and dosaging functions by means of the flowmeter, whereby even at the lowest angular speed of impeller 26, a signal of high voltage is available, for example, 1.5 V for controlling each successive circuit. If there should be a suspicion that in extremely low liquid flows which require high precision measurements, that the measuring result may be influenced by the apertures 34 of the disc, the disc may be made of ray-impermeable material, outside of the passageways for the rays.

In order to obtain a precise measurement result it is important, as already mentioned, that impeller 26 be mounted in such a fashion that it is easily running. Care should be taken that impeller 26 is play-free mounted in an axial direction. In one embodiment, this play-free mounting is obtained by a bearing bracket 66 (FIGS. 6 to 9) which essentially has a rectangular configuration. Bearing brake bracket 66 as well as housing parts 12 and 14 are made of injection-molded plastic material, whereby the two bracket segments 68 and 70 which are normally disposed relative to impeller axis 32 are injection molded with a certain pretension with respect to each other, as can be clearly see in FIGS. 8 and 10. Bracket segments 68 and 70 are provided with cup-shaped reinforcements 72, 74 concentrically disposed with respect to impeller axis 32, and which represent the intrinsic bearing supports for the impeller axis. This bearing support may be an injection molded bearing 76 as shown in FIG. 11 or a bearing jewel 78 (FIG. 10) which is inserted into a frame support 80 in reinforcement 72. Frame support 80 also comprises a pressure plate 84 biased by means of a pressure spring 82 so as to exert a low force pressure on bearing pin 86 of impeller axis 32, which pin engages bearing jewel 78, as shown in FIG. 10.

The total assembly of bearing bracket 66 and impeller 26 is such that only very low forces are exerted by the bearing bracket 66 onto the impeller axis 32, so that the rotation of the impeller axis is not influenced in any way.

The length of the impeller axis 32 is somewhat larger than the distance between bearing supports 76, 78 in pretensioned bearing bracket 66, so that after inserting impeller 26 into bearing bracket 66, the impeller is retained in absolute play-free position. The assembly unit consisting of bearing bracket 66 and impeller 26 is inserted into housing part 12 which is provided with a recess 88 (see FIG. 8) at the inner wall facing chamber 24 for receiving bearing bracket 66. In this way, bearing bracket 66 is positively retained within the housing. In the areas adjacent to reinforcements 72 and 76, the housing part 12 as well as the housing part 14 are provided with recesses 90 and 92. The surfaces of these recesses have a slight distance of about 0.1 mm from the surface of reinforcements 72, 74 so that no influence is extended into the bearing supports from housing 10, after bearing bracket 66 is inserted. A slot which is formed between the surface of reinforcements 72 and 74 and recesses 90 and 92 is coupled to chamber 24 and is filled with liquid flowing through the flowmeter. This liquid serves as an attenuation cushion and protects bearing bracket 66 and thereby the bearing supports of impeller 26 from shocks.

In order to precisely determine the spring path of bearing bracket segments 68 and 70, it is essential to provide cross-sectional tapers at the merging positions between the bearing bracket segments 68 and 70 which run normally with respect to impeller axis 32 and the parallel running bearing bracket segments 94, 96 as shown in FIGS. 9 and 10 at 98. Thereby, a hinge joint is created, whereby the bearing bracket segments between reinforcements 72 and 74 and the hinge joints determine the spring path. The pretension which is exerted in the bearing bracket is indicated by reference designation x in FIG. 10.

From FIG. 8, it also can be seen that adjacent to these hinge joints 98, segments 68, 70 of bearing bracket 66 are provided with apertures 100 which affords a soft linear elasticity of the bearing supports which prevent a tilting of the supports.

FIGS. 12 and 13 show another solution for the impeller mounting wherein a play-free mounting of the impeller axis 32 is made possible without a special bearing bracket. For this purpose, housing part 12 is provided with an injection molded bearing 102 for impeller axis 32. Bearing 102 is coupled with wall section 20, which is disposed normally with respect to the impeller axis, by means of a membrane-like segment 104 which also runs normally with respect to impeller axis 32. On the outer side of wall section 20, a cylindrical shoulder 108 is provided having a fine internal thread 106, in which an adjustment screw 110 is axially adjustable. Fine adjustment screw 110 presses with its front face 112, which is facing bearing 102, onto the bearing 102 and can adjust the bearing by about 0.2 mm in axial direction due to the spring action of the membrane-like segment 104, which is sufficient to provide a play-free mounting of the impeller axis 32. In order to prevent a radial displacement of the bearing, a recess is provided in the front face 112 of adjustment screw 110 which acts as a centering cone. A correspondingly-shaped end section of the bearing segment 102 engages the cone in a centering fashion.

Figure 5:
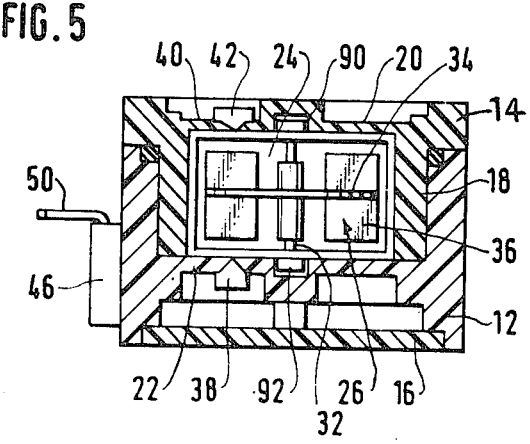
FIG. 5 is a sectional view, in part elevation, of the flowmeter shown in FIG. 3.

As can be clearly seen from FIG. 5, vanes 36 are disposed at a radial distance from impeller axis 32 in such a way that their inner ends, which face impeller axis 32, define an inner cylindrical open space concentric with axis 32. The outer ends of vanes 36 extend to the circumferential edge of disk 34. In axial direction, the vanes 36 extend substantially to the zone of the axial limit of chamber 24. Due to the radial distance between vanes 36 and impeller axis 32, a braking effect is prevented which could slow the impeller and which would thus not sensitively react when the quantity of liquid flows therethrough. Therefore, the gaps between vanes 36 and impeller axis 32 are suitable for increasing the measuring range of the flowmeter upwardly (i.e. for higher flow speeds).

Despite the high sensitivity of the inventive flowmeter, the meter is relatively inexpensive to make and operates in both directions in equal manner. The device has a low weight and low structural dimensions and can be installed by untrained operators into a liquid line without any difficulties. As shown in FIG. 4, the device may be assembled into a flowmeter block due to the bores 114 in housing 10 and screws 116 which extend through these bores and act as tie bars. In addition to the use in a laboratory, such as in the medical field, the flowmeter may also be used, for example, in the fuel line of motor vehicles to provide an economical way of driving.

While only several embodiments of the present invention have been shown and described, it will be obvious that many changes and modifications may be made thereunto without departing from the spirit and scope of the invention.

What is claimed is:

1. An improved flowmeter for liquids of the type including a housing, a cylindrical chamber formed in said housing, a shaft rotatably mounted in said housing and extending coaxially through said chamber, an impeller mounted on said shaft, and an inlet and outlet channel provided in said housing and communicating with said chamber, the improvement comprising:

a bearing bracket having a generally rectangular cross-sectional configuration and which includes two opposed and spaced apart bearing bracket segments which are disposed normally with respect to the impeller axis and each of which has a bearing element for receiving an end of said shaft, said segments being pretensioned in a direction toward each other, with the axial length of said shaft being slightly longer than the distance between said pretensioned segments so that a play-free mounting of said shaft in a radial direction within said bearing bracket is ensured, said bearing bracket, shaft and impeller constituting an assembly unit which is mounted in said housing free of outside stress; and contactless sensor means for scanning and monitoring the rotational speed of said impeller.

2. The flowmeter according to claim 1, wherein said housing has an inner face which is provided with recesses for receiving said bearing bracket, wherein said bearing bracket has inner faces which face said impeller and wherein the faces of said bearing bracket which face said impeller lock flush with the adjacent inner face of said housing.

3. The flowmeter according to claim 1, wherein said bearing bracket is made of injection molded plastic and wherein said bearing bracket segments thereof are formed with said pretension.

4. The flowmeter according to claim 1, wherein said segments of said bearing bracket are provided with outwardly protruding reinforcements which maintain at all sides a slight distance from the adjacent housing surface.

5. The flowmeter according to claim 5, wherein the distance between said reinforcements and said housing surface is about 0.1 mm.

6. The flowmeter according to claim 5, wherein the intermediary space between the outer face of the reinforcements and the adjacent housing surface communicate with said housing chamber.

7. The flowmeter according to claim 7, wherein said bearing brackets include two opposed spaced-apart wall segments which are disposed parallel to said shaft and are joined to opposite ends of said bracket segments and wherein at least in the area of merger between said bearing bracket segments and wall segments the bearing bracket cross section is tapered to form a hinge.

8. The flowmeter according to claim 8, wherein said area of merger between said bracket sements and said wall segments has a channel formed therein which provides the tapered portion of said bracket.

9. The flowmeter according to claim 1, wherein said bearing elements for receiving said shaft is injection molded into said bearing bracket.

10. The flowmeter according of claim 1, wherein a bearing element is inserted in each of said bearing segments of said bearing bracket and is provided with spring action abutments for biasely retaining the impeller axis in an axial direction.

* * * * *

UNITED STATES PATENT AND TRADEMARK OFFICE
CERTIFICATE OF CORRECTION

PATENT NO. : 4,172,381
DATED : OCTOBER 30, 1979
INVENTOR(S) : GEORG AIGNER

It is certified that error appears in the above—identified patent and that said Letters Patent is hereby corrected as shown below:

Column 1, line 12, change "Flowmeter" to --Flowmeters--; line 31, change "flowmeter" to --flowmeters--. Column 4, line 65, change "fragmentally" to --fragmentarily--. Column 5, line 9, change "fragmentally" to --fragmentarily--; line 64, change "flow meter" to --flowmeter--; line 64, change "excited" to --exited--. Column 6, line 5, after 'creases', change "," to --.--. Claim 5, line 1, change "claim 5" to --claim 4--. Claim 6, line 1, change "claim 5" to --claim 4--. Claim 7, line 1, change "claim 7" to --claim 6--. Claim 8, line 1, change "claim 8" to --claim 7--.

Signed and Sealed this

First Day of April 1980

[SEAL]

Attest:

SIDNEY A. DIAMOND

Attesting Officer     Commissioner of Patents and Trademarks